Figure 1:
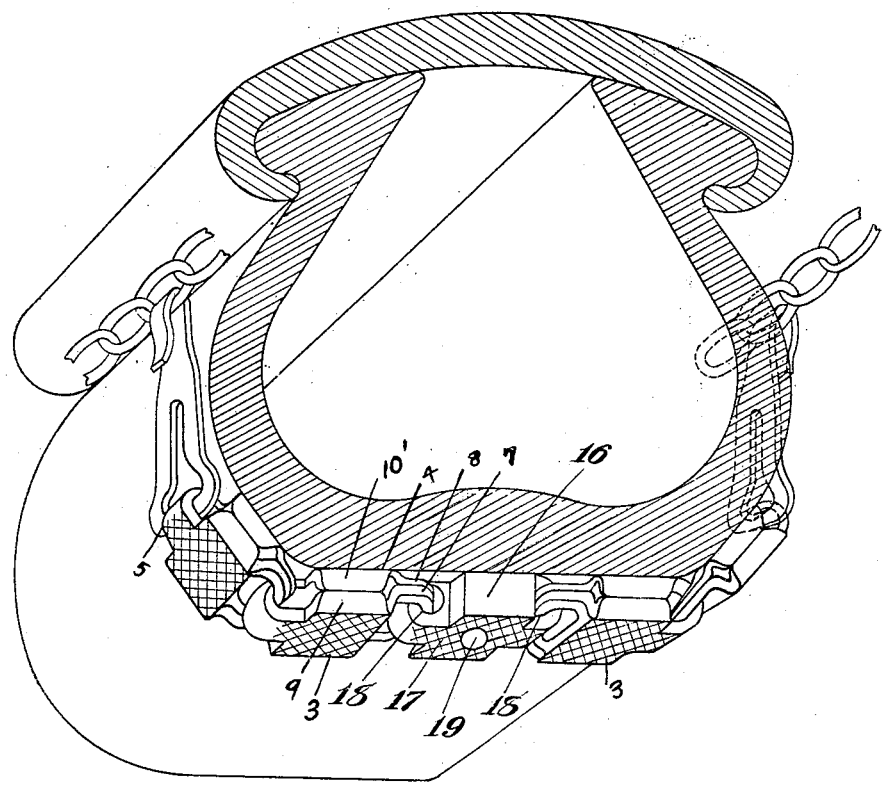

R. N. EVANS.
ANTISKID DEVICE OR CHAIN.
APPLICATION FILED FEB. 23, 1910.

979,139.

Patented Dec. 20, 1910.

Witnesses:
M. Levy
Chas. W. LaRue

Inventor:
Robert N. Evans
by Wilbur M. Stone
Attorney

UNITED STATES PATENT OFFICE.

ROBERT N. EVANS, OF NEW YORK, N. Y., ASSIGNOR TO ATLAS CHAIN COMPANY, OF NEW YORK, N. Y., A CORPORATION OF NEW YORK.

ANTISKID DEVICE OR CHAIN.

979,139.  Specification of Letters Patent.  Patented Dec. 20, 1910.

Application filed February 23, 1910. Serial No. 545,483.

*To all whom it may concern:*

Be it known that I, ROBERT N. EVANS, a citizen of the United States, and a resident of New York city, in the county of Kings and State of New York, have invented certain new and useful Improvements in Antiskid Devices or Chains, of which the following is a specification.

This invention relates to anti-skid devices or chains for tires commonly known as tire chains and used on tires of automobiles to prevent the slipping and skidding of the tires on the road.

The object of my invention is to furnish an improved cross member for the tread consisting of links, a portion of which can be simply made from sheet metal blanks and comprising integral means for flexibly connecting the links together and having its tread surface suitably reinforced against crushing; and others of said links can be simply made of steel blocks cut from a bar or otherwise.

In the drawings accompanying this specification my invention is illustrated in its preferred embodiment, wherein—

Figure 2:
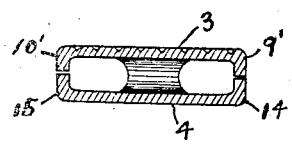
Figure 3:
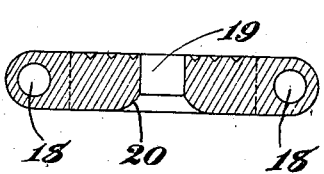
Figure 4:
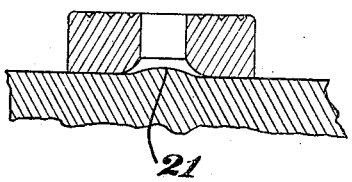

Figure 1 is a section of a portion of a tire showing one of these improved cross chains in position thereon and under compression from the weight of the machine. Fig. 2 is a cross sectional view on an enlarged scale of one of the box links. Fig. 3 is a longitudinal section of a block link which I preferably use as the center link in each cross member. Fig. 4 is a transverse section of the same.

The sheet metal link comprises a box link formed from a blank, having two flat portions 3 and 4 connected by a narrower portion 5 and at the outer ends of portions 3 and 4 are split eye portions 7 and 8, respectively for articulation with companion links. That flat portion as 3 of said blank which is to serve as the tread face is roughened or supplied with two or more sets of grooves crossing each other, for engagement with the road; or said tread may be provided with corrugations thereby forming ribs therebetween and said corrugations and ribs may lie at any of various angles lengthwise said blank or link. Opposite sides of flat portions 3 and 4 are bent to form lips or supports 9′ and 10′ as to portion 3 and 14 and 15 as to portion 4. The open eye portions are also bent upwardly to some extent so that in the next bending operation said eye portions will be brought together face to face. The partly bent blank is then folded at its narrow portion 5 and portions 9′ and 14 and portions 10′ and 15 respectively, brought together edge to edge, thus bringing flat portions 3 and 4 into parallelism but offset from each other. The split eyes also come together face to face in register as shown.

Referring now to Figs. 1, 3 and 4, there is therein illustrated my improved block or solid link, said link preferably being the center link of each cross chain (Fig. 1) to take the heaviest duty in use. Said link 16 is formed from a solid block of suitable material preferably steel, and may be furnished with a roughened or corrugated tread face 17. Each end of said link is provided with a transverse hole or eye 18 for articulation with the adjoining links. I also preferably provide said link with an opening 19 therein from its tread face to its rear face and preferably chamfer out or countersink said opening at the rear end 20 thereof so as to present a smooth and non-cutting surface for contact with the tire. The tread face portion of said hole 19 is efficient to furnish additional holding means on the road and the countersunk rear face portion 20 of said hole is efficient to gently engage the tire when under pressure whereby said tire as at 21, enters more or less into said opening thus preventing side slippage or creeping of the chain on said tire.

To assemble the links the split eyes 7, 8 are brought adjacent to opposite sides respectively of the open loop formed by bent portion 5 of another sheet metal link or of one of holes 18 of block link 16 and the split portions are forced inwardly to bring their ends together whereby the portion 5 or eye of the block link as the case may be, is inclosed within the now closed eye 7, 8. The adjacent links are thus articulated by integral means. I thus provide a cross member of as many links as desired and comprising a plurality of links of sheet metal box construction and a center link of block construction and all simple and rigid and which may have tread surfaces provided with road gripping means of high efficiency.

It will be observed that the block link is of cross-shape and comprises a body or central portion of relatively great width and breadth, and extensions or ears for the reception of the loops of adjacent links, these extensions or ears being of much less width than the width of the body, so that they are adapted to receive the eyes or loops of the box links at each side thereof, the openings of which may be of less width than the maximum width of the box links. It will also be observed that the width of the block or center link is considerably greater than the width of the box links, so that it projects beyond the plane of the sides of the box links. By forming the block link of considerable width, and of a width greater than the width of the box links, I obtain several advantages, one of which is a considerable tread surface centrally of the tire upon the road, another a considerable protection to the tire itself, since, as the cross chains are located relatively close together it follows that, by making the block-formed link of greater width than the box-formed links a greater surface of the tire is protected lengthwise of the tire as well as a greater tread surface on the road obtained, so that the box links may be made comparatively small, as the larger proportion of the wear comes upon the block links. But in addition to these advantages, I obtain a very important advantage, in that, by making the block link of considerable width, and of greater width than the box links, it prevents the turning over of the chain on the tire in use. In other words, the rolling of the chain and the turning over thereof upon the tire is prevented, since, as the block links are of considerable width they project beyond the plane of the sides of the box links and act to prevent the turning over of the chain upon the tire. This thus enables me to form the box links of the cross member relatively small and with rounded edges where they engage the tire, since, as stated, the formation of the block link is such that it will prevent the rolling of the box links or the turning of the cross member upon the tire. Thus there are important advantages in making the block link of cruciform construction. In the present improvement it will also be observed that the loops of the box links which are articulated with the block formed link are offset from the flat or parallel portions of such box links and are within the plane of such flat portions, so as to prevent wear upon these loops, and that by forming the block-formed link of substantially the same thickness as the box-formed links the apertured extensions of the block-formed link protect the loops of the box-formed links and receive the wear at this point while the box-formed and block links form a continuous tread surface across the tire.

I claim:

1. In an anti-skid chain for vehicle tires a cross member made up of a plurality of articulated box-formed links and a block center link located midway of such cross member, said block center link and box formed links forming a continuous tread surface across the tire, and said block link having projecting ears for the articulation of a pair of said box formed links.

2. A cruciform block link for the cross member of an anti-skid tire chain, comprising a broad and wide center or body portion having a width substantially at least as great as its breadth and having opposed extensions provided with openings therethrough for the articulation of adjacent links of the cross member.

3. A cruciform block link for the cross member of an anti-skid tire chain, comprising a broad and wide center or body portion having a width substantially at least as great as its breadth having opposed extensions provided with openings therethrough for the attachment of adjacent links, said body portion having a centrally located opening and a roughened tread surface.

4. In an anti-skid chain for vehicle tires, a cross member made up of a plurality of box-formed links, each comprising a pair of flat parallel tread portions spaced and maintained apart and integrally connected at one end by a bent portion forming a loop and having at the other end an integrally formed loop offset and within the plane of such flat portions, and a block center link located midway of such cross member and of substantially the same depth or thickness as the tread portions of the box-formed links and having extensions articulated with the offset loops of the box-formed links, said extensions having substantially the same depth or thickness as such tread portions of the box-formed links.

Signed in the Park Row Building, New York, N. Y. this 21st day of February, nineteen hundred and ten before two subscribing witnesses.

ROBERT N. EVANS.

Witnesses:
 CHARLES W. LA RUE,
 M. H. CORMACK.